US012587390B2

(12) United States Patent
Kang et al.

(10) Patent No.: US 12,587,390 B2
(45) Date of Patent: Mar. 24, 2026

(54) METHOD OF OPERATING SECURE PROGRAMMING SYSTEM

(71) Applicant: Dediprog Technology Co., Ltd., Taipei City (TW)

(72) Inventors: Ming-Hui Kang, Taipei City (TW); Hui-Kai Huang, Taipei City (TW)

(73) Assignee: DEDIPROG TECHNOLOGY CO., LTD., Taipei City (TW)

( * ) Notice: Subject to any disclaimer, the term of this patent is extended or adjusted under 35 U.S.C. 154(b) by 8 days.

(21) Appl. No.: 18/767,037

(22) Filed: Jul. 9, 2024

(65) Prior Publication Data

US 2025/0023746 A1 Jan. 16, 2025

Related U.S. Application Data

(60) Provisional application No. 63/525,825, filed on Jul. 10, 2023, provisional application No. 63/525,809, filed on Jul. 10, 2023.

(30) Foreign Application Priority Data

Oct. 31, 2023 (TW) ................................. 112141864
Oct. 31, 2023 (TW) ................................. 112141865

(51) Int. Cl.
*H04L 9/32* (2006.01)
*H04L 9/08* (2006.01)
*H04L 9/30* (2006.01)

(52) U.S. Cl.
CPC ............ *H04L 9/3263* (2013.01); *H04L 9/088* (2013.01); *H04L 9/30* (2013.01); *H04L 9/3226* (2013.01); *H04L 9/3247* (2013.01)

(58) Field of Classification Search
CPC ..... H04L 9/0643; H04L 9/088; H04L 9/3226; H04L 9/3242; H04L 9/3247; H04L 9/3263; H04L 9/3268
See application file for complete search history.

(56) References Cited

U.S. PATENT DOCUMENTS 5,857,022 A 1/1999 Sudia
9,781,086 B2 10/2017 Jelatis et al.
(Continued)

FOREIGN PATENT DOCUMENTS

CN 107979467 A 5/2018
CN 108647499 A 10/2018
(Continued)

OTHER PUBLICATIONS

U.S. Notice of Allowance for U.S. Appl. No. 18/397,606, dated Oct. 17, 2025.
(Continued)

*Primary Examiner* — Eric W Shepperd
(74) *Attorney, Agent, or Firm* — Birch, Stewart, Kolasch & Birch, LLP

(57) ABSTRACT

A method of operating a secure programming system is provided. The method can use the first authentication module as the root authentication module to authorize the second authentication module of the program burning system when the first authentication module fails to provide the private key. In this way, the second authentication module obtains the second certificate composed of the second digital signature and becomes the first relay authentication module authorized by the first authentication module to issue certificates on behalf of the first authentication module, so that the program burning system can perform burning operations and process operations. Therefore, the method of the present disclosure can not only achieve the purpose of signing the same certificate in a more secure manner, but also help the first authentication module to be more flexible in classifying the second authentication module according to different product application categories or methods.

18 Claims, 16 Drawing Sheets

(56) References Cited

U.S. PATENT DOCUMENTS

| | | | |
|---|---|---|---|
| 9,900,310 B2 | 2/2018 | Brickell | |
| 10,069,633 B2 | 9/2018 | Gulati et al. | |
| 10,110,411 B2 | 10/2018 | Gulati | |
| 10,263,790 B2 | 4/2019 | Gulati et al. | |
| 11,336,440 B2 | 5/2022 | Shpurov et al. | |
| 11,895,250 B2* | 2/2024 | Simplicio | H04L 9/0894 |
| 12,132,841 B2 | 10/2024 | Smith, III et al. | |
| 12,160,516 B2 | 12/2024 | Ngo et al. | |
| 2004/0117612 A1 | 6/2004 | Falk | |
| 2005/0076216 A1 | 4/2005 | Nyberg | |
| 2013/0073856 A1* | 3/2013 | Sherkin | H04L 63/0428 |
| | | | 713/176 |
| 2014/0164779 A1* | 6/2014 | Hartley | H04L 9/0866 |
| | | | 713/176 |
| 2016/0092701 A1* | 3/2016 | Shah | H04W 4/60 |
| | | | 713/189 |
| 2018/0219857 A1* | 8/2018 | Bhattacharya | H04L 63/0807 |
| 2019/0052464 A1* | 2/2019 | Doliwa | H04L 63/0807 |
| 2019/0163909 A1* | 5/2019 | Schilder | G06F 21/79 |
| 2019/0188387 A1* | 6/2019 | Fu | H04L 9/0894 |
| 2019/0273616 A1 | 9/2019 | Bres | |
| 2019/0289006 A1* | 9/2019 | Fang | H04W 4/70 |
| 2022/0014389 A1* | 1/2022 | Nix | H04L 9/0838 |
| 2023/0009032 A1* | 1/2023 | Khatri | G06Q 30/0645 |
| 2023/0010345 A1* | 1/2023 | Khatri | G09C 1/00 |
| 2023/0185482 A1 | 6/2023 | Steinmetz et al. | |

FOREIGN PATENT DOCUMENTS

| | | |
|---|---|---|
| CN | 111342955 A | 6/2020 |
| CN | 114912138 A | 8/2022 |
| CN | 116070215 A | 5/2023 |
| CN | 116257820 A | 6/2023 |
| TW | 201401102 A | 1/2014 |
| TW | 201820132 A | 6/2018 |
| TW | 202207664 A | 2/2022 |
| TW | 202232912 A | 8/2022 |
| TW | I773161 B | 8/2022 |
| WO | WO 2020/052335 A1 | 3/2020 |

OTHER PUBLICATIONS

U.S. Office Action for U.S. Appl. No. 18/397,674, dated Nov. 4, 2025.

U.S. Office Action for U.S. Appl. No. 18/767,037, dated Jan. 20, 2026.

* cited by examiner using the first authentication module as a root authentication module to verify and issue a first certificate — S1 providing a first hash value and a first original information to the first authentication module by the second authentication module, wherein the first authentication module uses the first certificate private key to encrypt a second hash value regenerated from the first original information provided by the second authentication module, so that a second certificate composed of the second digital signature signed by the first authentication module is generated, wherein the second authentication module obtains the second certificate composed of the second digital signature and becomes a first relay authentication module authorized by the first authentication module to issue certificates on behalf of the first authentication module — S2 while a first burning process is executed, the first programmer of the second authentication module served as the first relay authentication module using a first security control unit key generated by the first security control unit to decrypt a first encrypted job control package so as to extract a first payload — S3 the first programmer generating a first verification code calculated from the first payload — S4

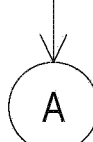

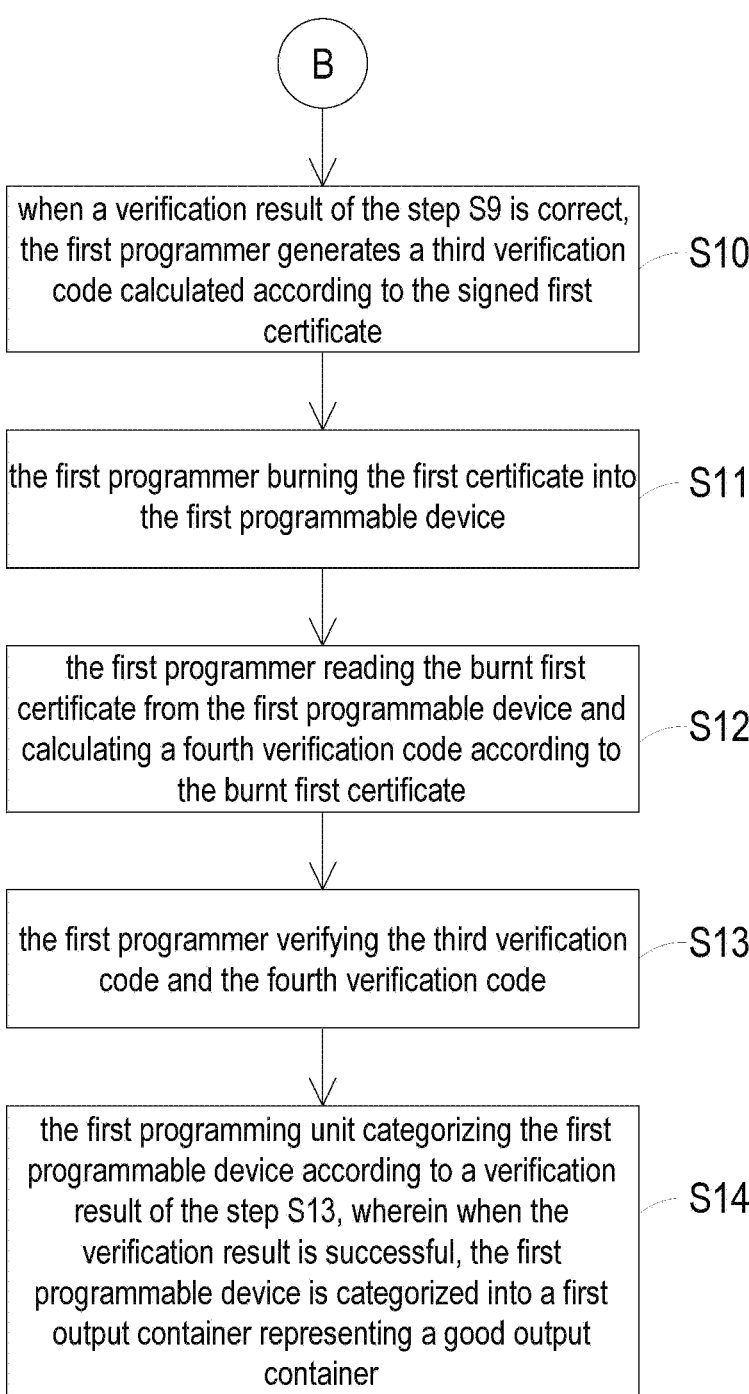

B when a verification result of the step S9 is correct, the first programmer generates a third verification code calculated according to the signed first certificate — S10 the first programmer burning the first certificate into the first programmable device — S11 the first programmer reading the burnt first certificate from the first programmable device and calculating a fourth verification code according to the burnt first certificate — S12 the first programmer verifying the third verification code and the fourth verification code — S13 the first programming unit categorizing the first programmable device according to a verification result of the step S13, wherein when the verification result is successful, the first programmable device is categorized into a first output container representing a good output container — S14

FIG. 1C

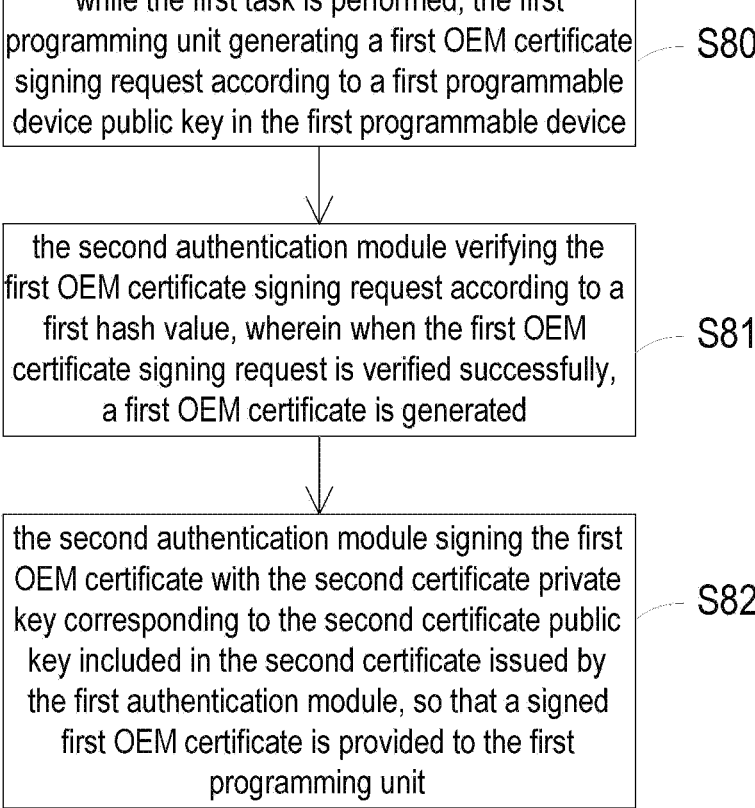

while the first task is performed, the first programming unit generating a first OEM certificate signing request according to a first programmable device public key in the first programmable device        ⟋~ S80 the second authentication module verifying the first OEM certificate signing request according to a first hash value, wherein when the first OEM certificate signing request is verified successfully, a first OEM certificate is generated        ⟋~ S81 the second authentication module signing the first OEM certificate with the second certificate private key corresponding to the second certificate public key included in the second certificate issued by the first authentication module, so that a signed first OEM certificate is provided to the first programming unit        ⟋~ S82

FIG. 3 the first authentication module providing at least one signed first OEM certificate to the second authentication module in advance — S83 while the first task is performed, the second authentication module receiving the first programmable device public key from the first programmable device, and querying the corresponding signed first OEM certificate from the second authentication module based on the first programmable device public key received, so that the signed first OEM certificate is provided to the first programming unit — S84

FIG. 4

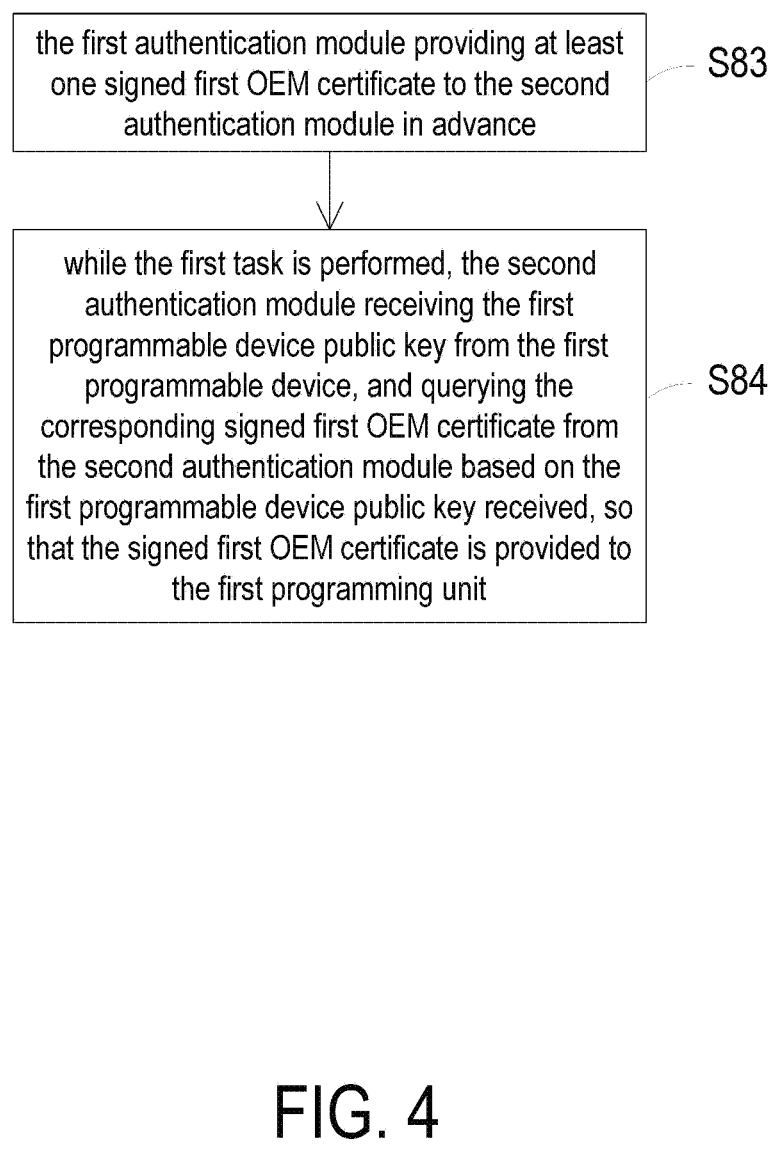

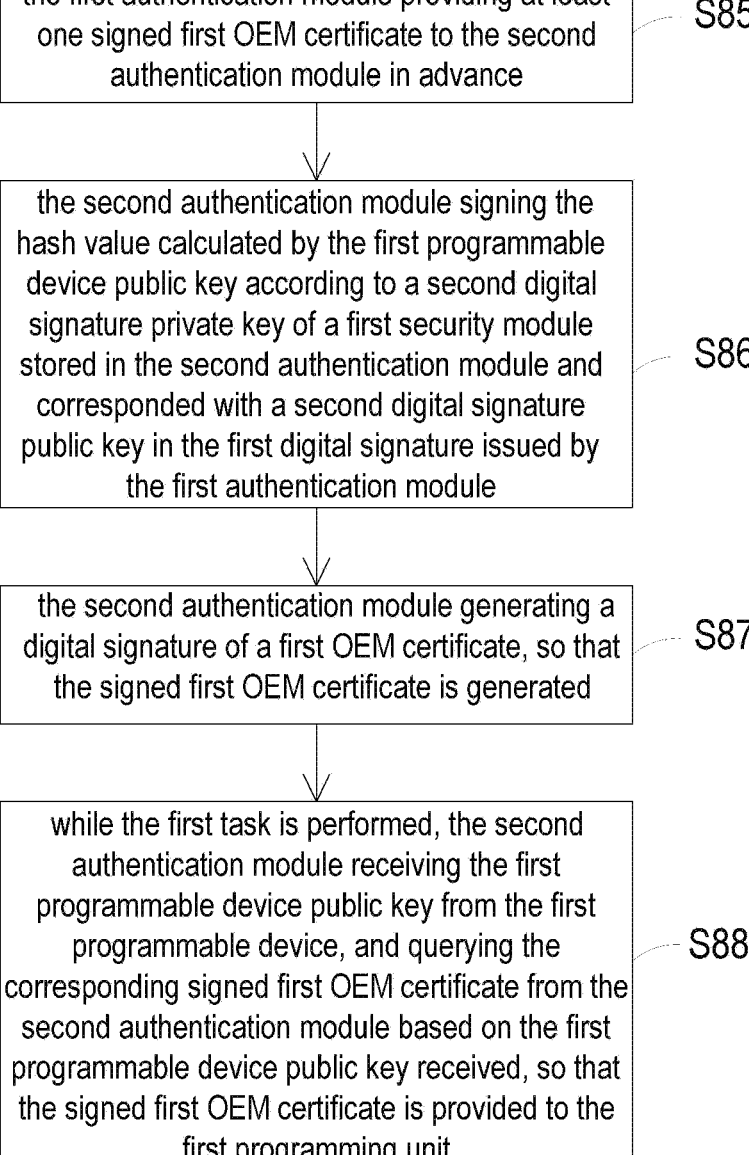

the first authentication module providing at least one signed first OEM certificate to the second authentication module in advance — S85 the second authentication module signing the hash value calculated by the first programmable device public key according to a second digital signature private key of a first security module stored in the second authentication module and corresponded with a second digital signature public key in the first digital signature issued by the first authentication module — S86 the second authentication module generating a digital signature of a first OEM certificate, so that the signed first OEM certificate is generated — S87 while the first task is performed, the second authentication module receiving the first programmable device public key from the first programmable device, and querying the corresponding signed first OEM certificate from the second authentication module based on the first programmable device public key received, so that the signed first OEM certificate is provided to the first programming unit — S88

FIG. 5

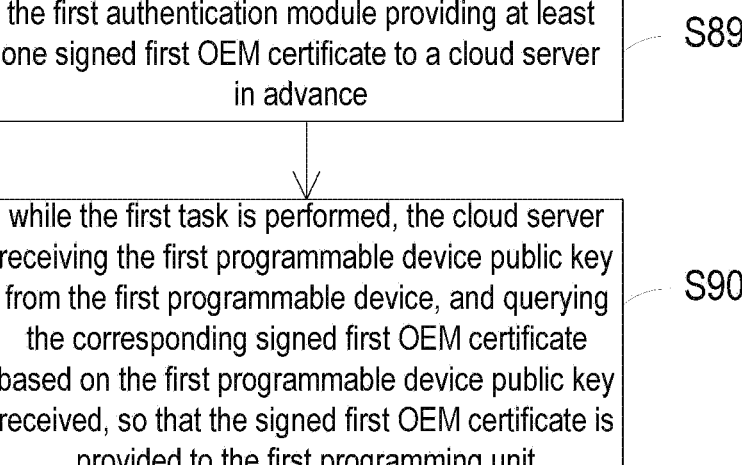

the first authentication module providing at least one signed first OEM certificate to a cloud server in advance — S89 while the first task is performed, the cloud server receiving the first programmable device public key from the first programmable device, and querying the corresponding signed first OEM certificate based on the first programmable device public key received, so that the signed first OEM certificate is provided to the first programming unit — S90

FIG. 6

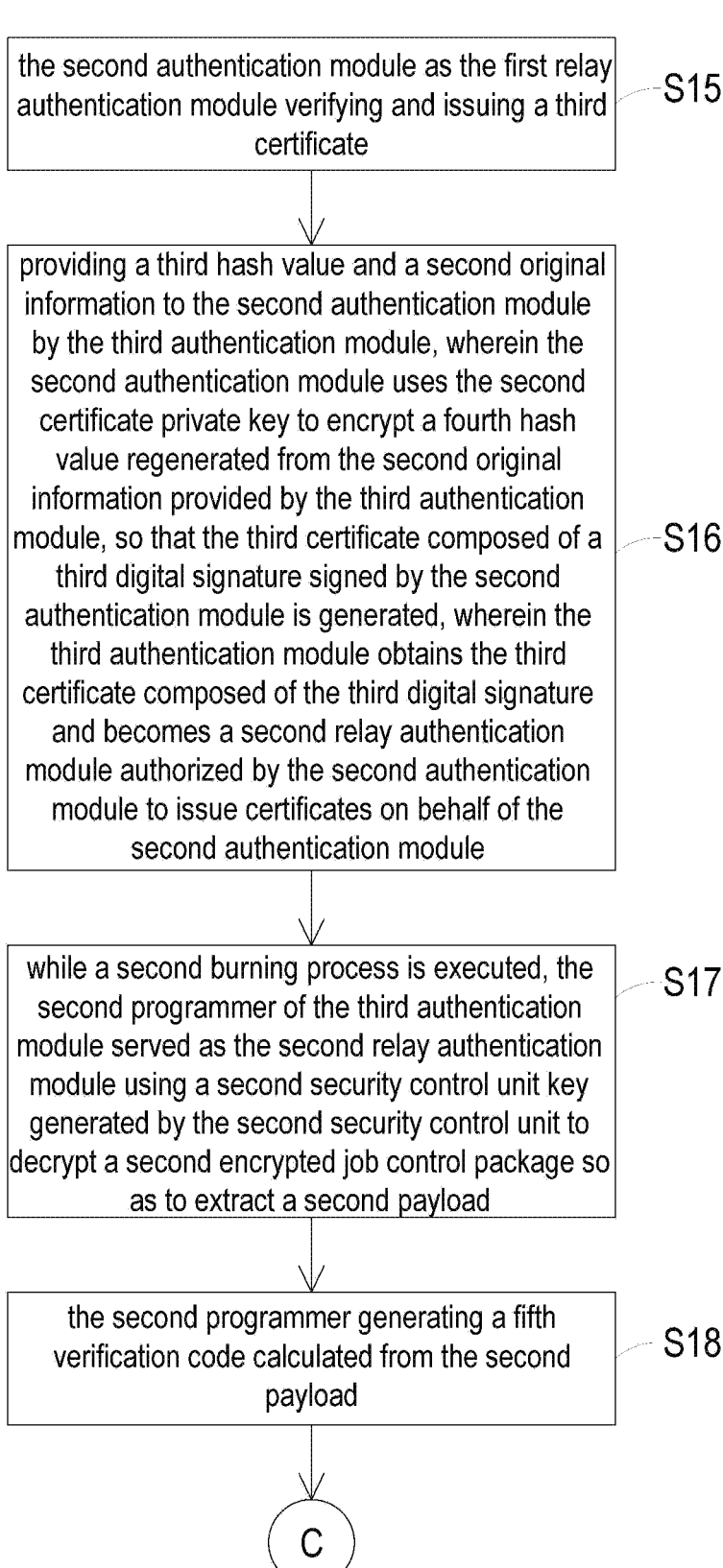

the second authentication module as the first relay authentication module verifying and issuing a third certificate ⟋ S15 providing a third hash value and a second original information to the second authentication module by the third authentication module, wherein the second authentication module uses the second certificate private key to encrypt a fourth hash value regenerated from the second original information provided by the third authentication module, so that the third certificate composed of a third digital signature signed by the second authentication module is generated, wherein the third authentication module obtains the third certificate composed of the third digital signature and becomes a second relay authentication module authorized by the second authentication module to issue certificates on behalf of the second authentication module ⟋ S16 while a second burning process is executed, the second programmer of the third authentication module served as the second relay authentication module using a second security control unit key generated by the second security control unit to decrypt a second encrypted job control package so as to extract a second payload ⟋ S17 the second programmer generating a fifth verification code calculated from the second payload ⟋ S18

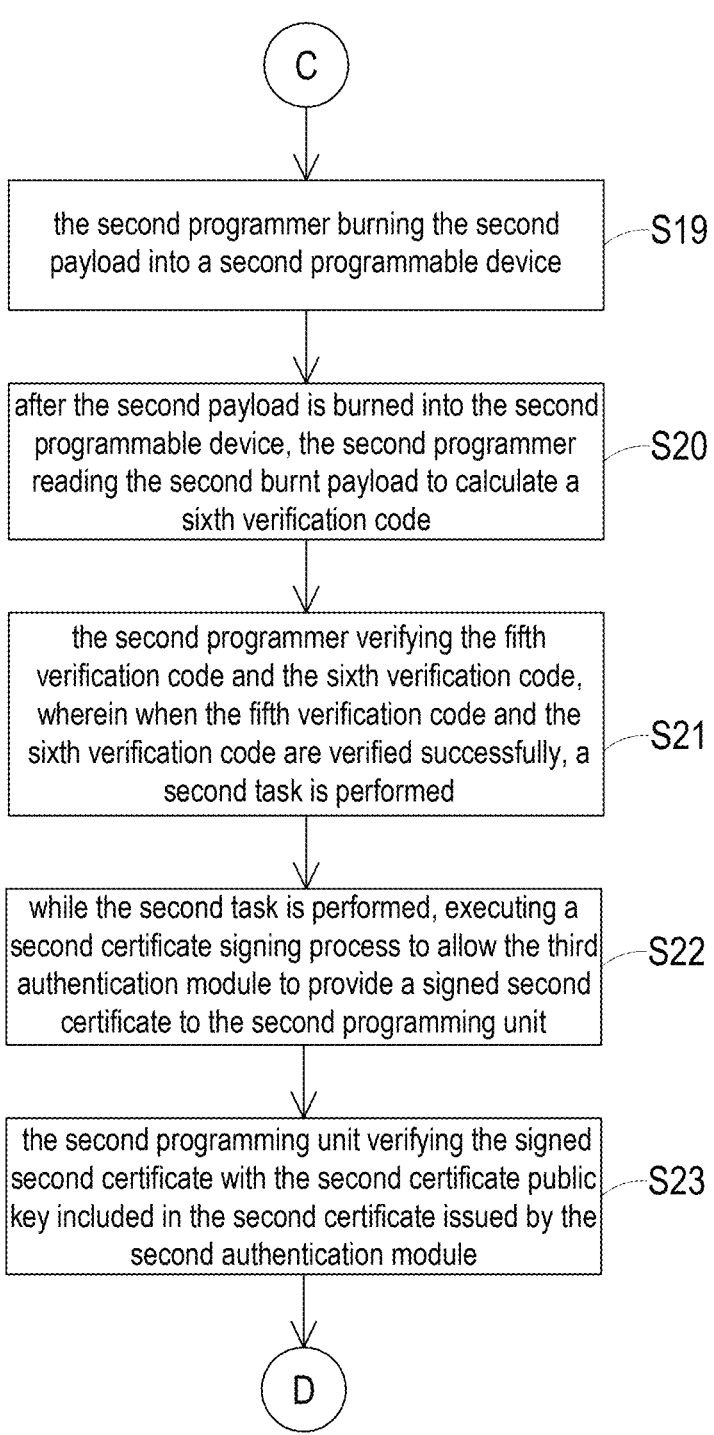

C the second programmer burning the second payload into a second programmable device          S19 after the second payload is burned into the second programmable device, the second programmer reading the second burnt payload to calculate a sixth verification code          S20 the second programmer verifying the fifth verification code and the sixth verification code, wherein when the fifth verification code and the sixth verification code are verified successfully, a second task is performed          S21 while the second task is performed, executing a second certificate signing process to allow the third authentication module to provide a signed second certificate to the second programming unit          S22 the second programming unit verifying the signed second certificate with the second certificate public key included in the second certificate issued by the second authentication module          S23

D

Figure 9:
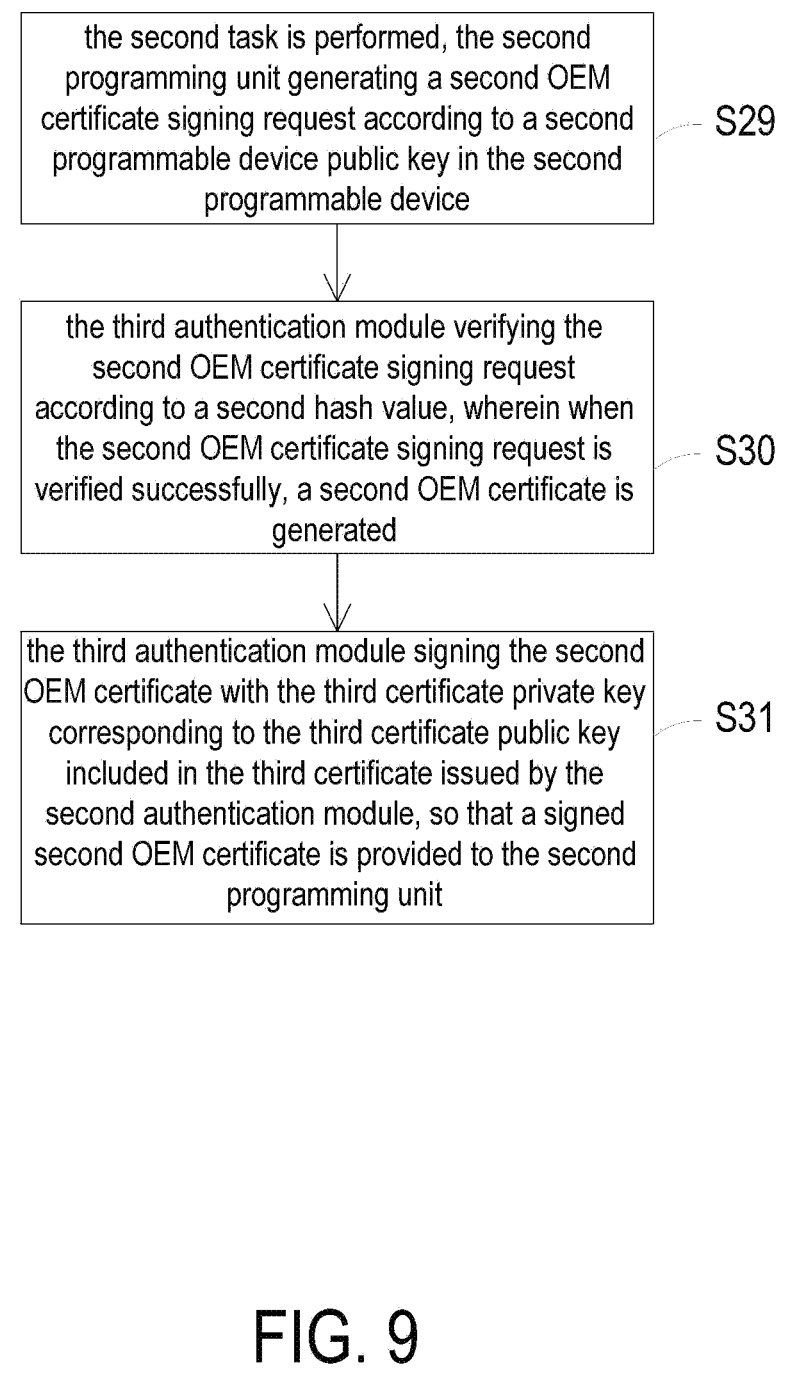

FIG. 8B the second task is performed, the second
programming unit generating a second OEM
certificate signing request according to a second
programmable device public key in the second
programmable device
— S29 the third authentication module verifying the
second OEM certificate signing request
according to a second hash value, wherein when
the second OEM certificate signing request is
verified successfully, a second OEM certificate is
generated
— S30 the third authentication module signing the second
OEM certificate with the third certificate private key
corresponding to the third certificate public key
included in the third certificate issued by the
second authentication module, so that a signed
second OEM certificate is provided to the second
programming unit
— S31

FIG. 9 the second authentication module providing at least one signed second OEM certificate to the third authentication module in advance — S32 while the second task is performed, the third authentication module receiving the second programmable device public key from the second programmable device, and querying the corresponding signed second OEM certificate from the third authentication module based on the second programmable device public key received, so that the signed second OEM certificate is provided to the second programming unit — S33

FIG. 10

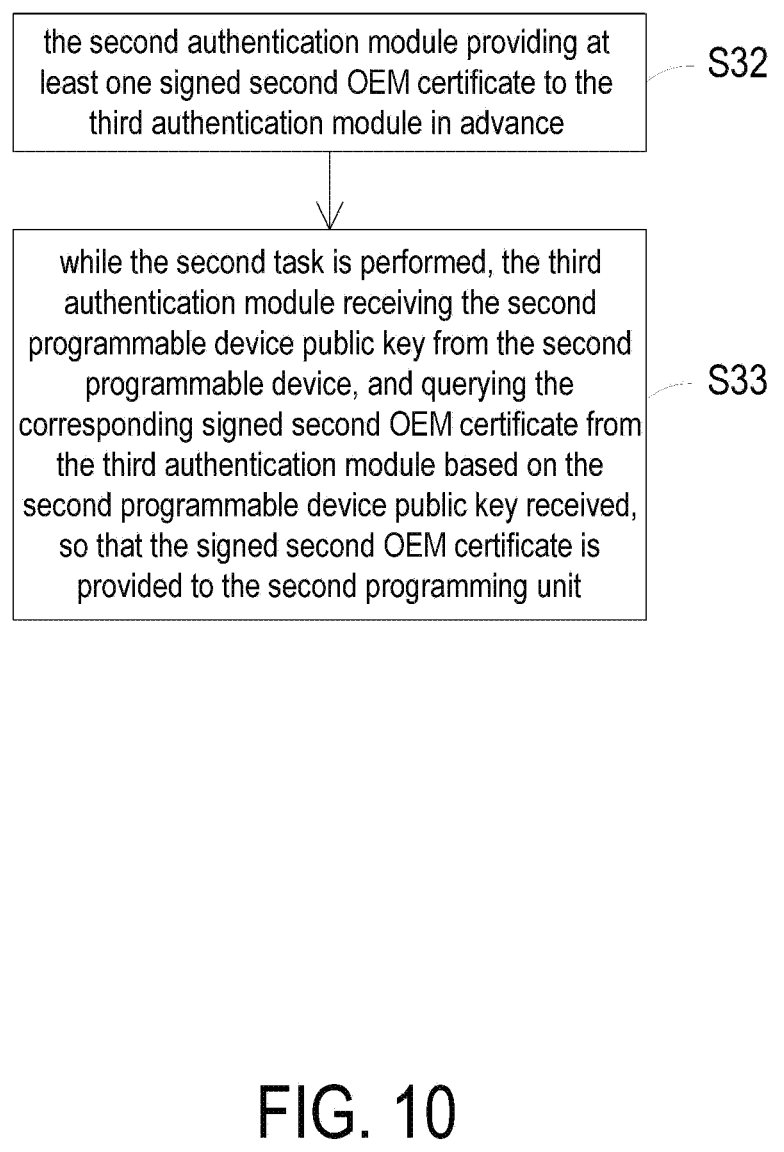

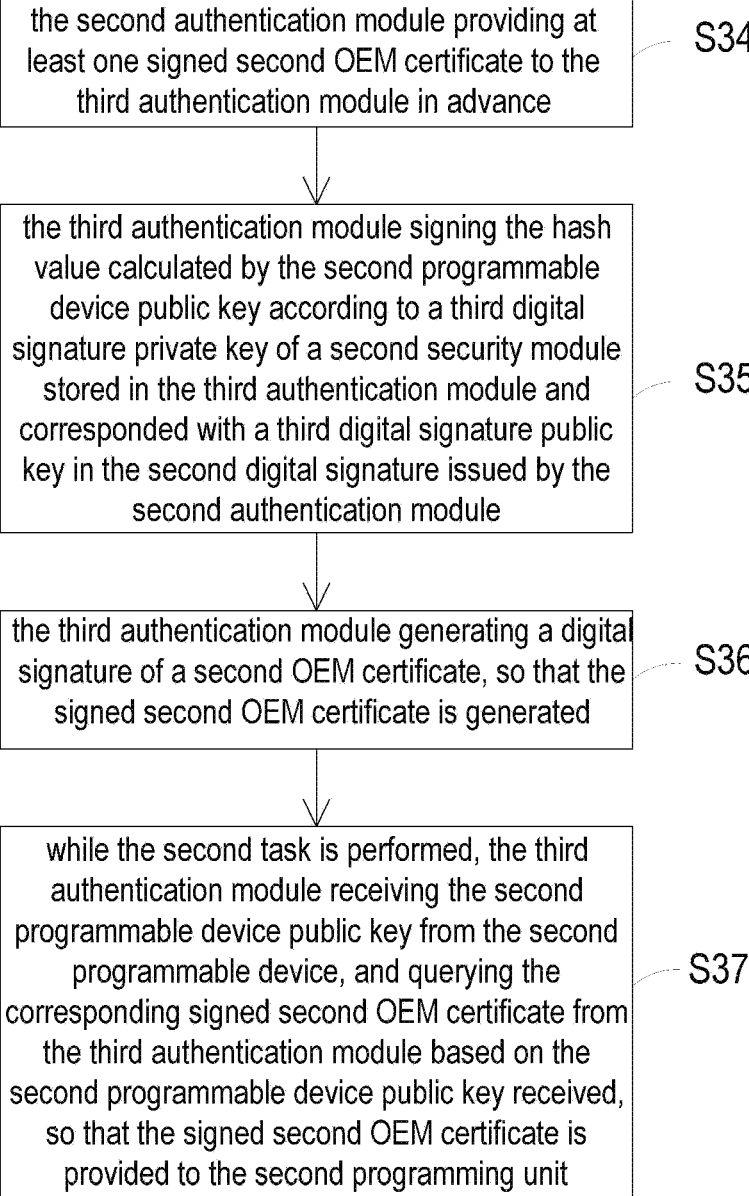

the second authentication module providing at least one signed second OEM certificate to the third authentication module in advance — S34 the third authentication module signing the hash value calculated by the second programmable device public key according to a third digital signature private key of a second security module stored in the third authentication module and corresponded with a third digital signature public key in the second digital signature issued by the second authentication module — S35 the third authentication module generating a digital signature of a second OEM certificate, so that the signed second OEM certificate is generated — S36 while the second task is performed, the third authentication module receiving the second programmable device public key from the second programmable device, and querying the corresponding signed second OEM certificate from the third authentication module based on the second programmable device public key received, so that the signed second OEM certificate is provided to the second programming unit — S37

FIG. 11 the second authentication module providing at least one signed second OEM certificate to a cloud server in advance          S38 while the second task is performed, the cloud server receiving the second programmable device public key from the second programmable device, and querying the corresponding signed second OEM certificate based on the second programmable device public key received, so that the signed second OEM certificate is provided to the second programming unit          S39

FIG. 12

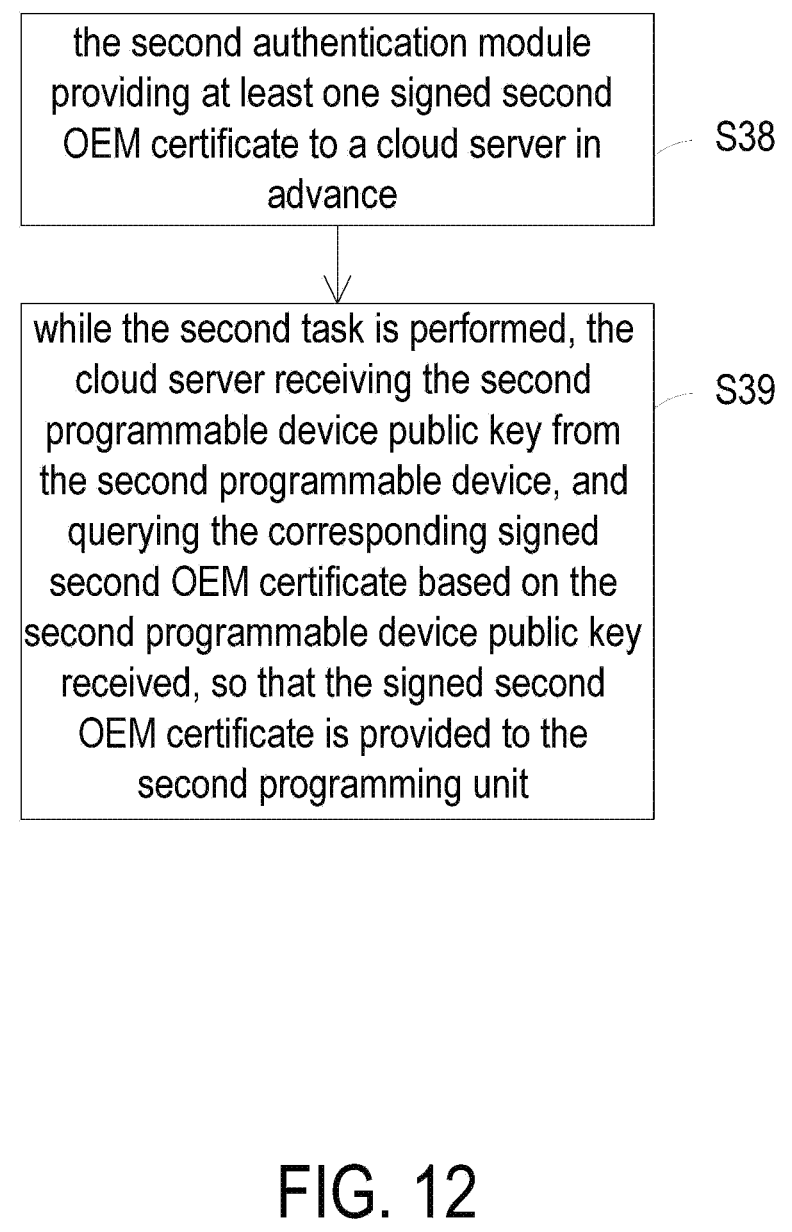

METHOD OF OPERATING SECURE PROGRAMMING SYSTEM

CROSS-REFERENCE TO RELATED APPLICATION

This application claims the benefit of U.S. Provisional Application Ser. No. 63/525,825 filed on Jul. 10, 2023, and claims the benefit of U.S. Provisional Application Ser. No. 63/525,809 filed on Jul. 10, 2023. This application claims priority to Taiwan Patent Application No. 112141865 filed on Oct. 31, 2023, and claims priority to Taiwan Patent Application No. 112141864 filed on Oct. 31, 2023. The entire contents of the above-mentioned patent applications are incorporated herein by reference for all purposes.

FIELD OF THE INVENTION

The present invention relates to the technology of a secure programming system, and more particularly to a method of operating a secure programming system.

BACKGROUND OF THE INVENTION

In the existing burning operations and processes, in order to prevent the burned data from being tampered with, damaged, leaked and plagiarized, only devices that hold the corresponding paired public key or private key and pass real-time identity verification can read the burned data. For example, the original equipment manufacturer provides a private key pairing process, and the original equipment manufacturer's private key is encrypted and protected through a paired public key provided by the burning center. Then, it is sent to the hardware encryption module of the burning center. It has to be decrypted with the private key stored in the hardware encryption module and corresponding to the public key of the burning center, and then the decrypted private key of the original equipment manufacturer is stored in the hardware encryption module.

Although the above method of transmitting the paired private key provided by the original equipment manufacturer can effectively protect the private key, if the original equipment manufacturer fails to provide the private key based on specific considerations, it will cause the burning operation and process in the burning center to be very inconvenient.

Therefore, there is a need of providing a method of operating a secure programming system to obviate the drawbacks encountered by the prior arts.

SUMMARY OF THE INVENTION

The present invention provides a method of operating a secure programming system. The method can achieve the purpose of signing certificates for authorization in a more secure way, and help the original equipment manufacturers to be more flexible in classifying authentication modules according to the different product application categories or methods.

In accordance with an aspect of the present invention, a method of operating a secure programming system is provided. The secure programming system includes a first authentication module and a program burning system, and the program burning system includes a second authentication module, a first programmer, a first programming unit and a first security control unit. The method includes steps of: (S1) using the first authentication module as a root authentication module to verify and issue a first certificate, wherein the first certificate comprises a first certificate public key, a first digital signature and a first information content used to identify the first certificate, the first certificate public key corresponds to a first certificate private key, and the first digital signature is signed by the first certificate private key; (S2) providing a first hash value and a first original information to the first authentication module by the second authentication module, wherein the first original information is used to generate the first hash value, the first authentication module uses the first certificate private key to encrypt a second hash value regenerated from the first original information provided by the second authentication module, so that a second certificate composed of the second digital signature signed by the first authentication module is generated, and the first hash value is used for verification before the first authentication module signs the second hash value regenerated from the first original information, wherein the second certificate comprises the second digital signature signed by the first certificate private key of the first authentication module, a second information content used to identify the second certificate, the first information content of the first certificate, the first digital signature of the first certificate and a second certificate public key, the second certificate public key corresponds to a second certificate private key, and the second authentication module obtains the second certificate composed of the second digital signature and becomes a first relay authentication module authorized by the first authentication module to issue certificates on behalf of the first authentication module; (S3) while a first burning process is executed, the first programmer of the second authentication module served as the first relay authentication module using a first security control unit key generated by the first security control unit to decrypt a first encrypted job control package so as to extract a first payload; (S4) the first programmer generating a first verification code calculated from the first payload; (S5) the first programmer burning the first payload into a first programmable device; (S6) after the first payload is burned into the first programmable device, the first programmer reading the burnt first payload to calculate a second verification code; (S7) the first programmer verifying the first verification code and the second verification code, wherein when the first verification code and the second verification code are verified successfully, a first task is performed; (S8) while the first task is performed, executing a first certificate signing process to allow the second authentication module to provide a signed first certificate to the first programming unit; (S9) the first programming unit verifying the signed first certificate with the first certificate public key included in the first certificate issued by the first authentication module; (S10) when a verification result of the step S9 is correct, the first programmer generates a third verification code calculated according to the signed first certificate; (S11) the first programmer burning the first certificate into the first programmable device; (S12) the first programmer reading the burnt first certificate from the first programmable device and calculating a fourth verification code according to the burnt first certificate; (S13) the first programmer verifying the third verification code and the fourth verification code; and (S14) the first programming unit categorizing the first programmable device according to a verification result of the step S13, wherein when the verification result is successful, the first programmable device is categorized into a first output container representing a good output container.

The above contents of the present invention will become more readily apparent to those ordinarily skilled in the art after reviewing the following detailed description and accompanying drawings, in which:

BRIEF DESCRIPTION OF THE DRAWINGS

FIGS. 1A to 1C illustrate a flowchart of a method of operating a secure programming system according to an embodiment of the present disclosure;

FIG. 3 illustrates a flow chart of the first certificate signing process in the step S8 shown in FIGS. 1A to 1C according to the first embodiment of the present disclosure;

FIG. 4 illustrates a flow chart of the first certificate signing process in the step S8 shown in FIGS. 1A to 1C according to a second embodiment of the present disclosure;

FIG. 5 illustrates a flow chart of the first certificate signing process in the step S8 shown in FIGS. 1A to 1C according to a third embodiment of the present disclosure;

FIG. 6 illustrates a flow chart of the first certificate signing process in the step S8 shown in FIGS. 1A to 1C according to a fourth embodiment of the present disclosure;

FIGS. 8A to 8C illustrate a flowchart of a method of operating the secure programming system shown in FIG. 7 according to an embodiment of the present disclosure;

FIG. 9 illustrates a flow chart of the second certificate signing process in the step S22 shown in FIGS. 8A to 8C according to a first embodiment of the present disclosure;

FIG. 10 illustrates a flow chart of the second certificate signing process in the step S22 shown in FIGS. 8A to 8C according to a second embodiment of the present disclosure;

FIG. 11 illustrates a flow chart of the second certificate signing process in the step S22 shown in FIGS. 8A to 8C according to a third embodiment of the present disclosure; and FIG. 12 illustrates a flow chart of the second certificate signing process in the step S22 shown in FIGS. 8A to 8C according to a fourth embodiment of the present disclosure.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
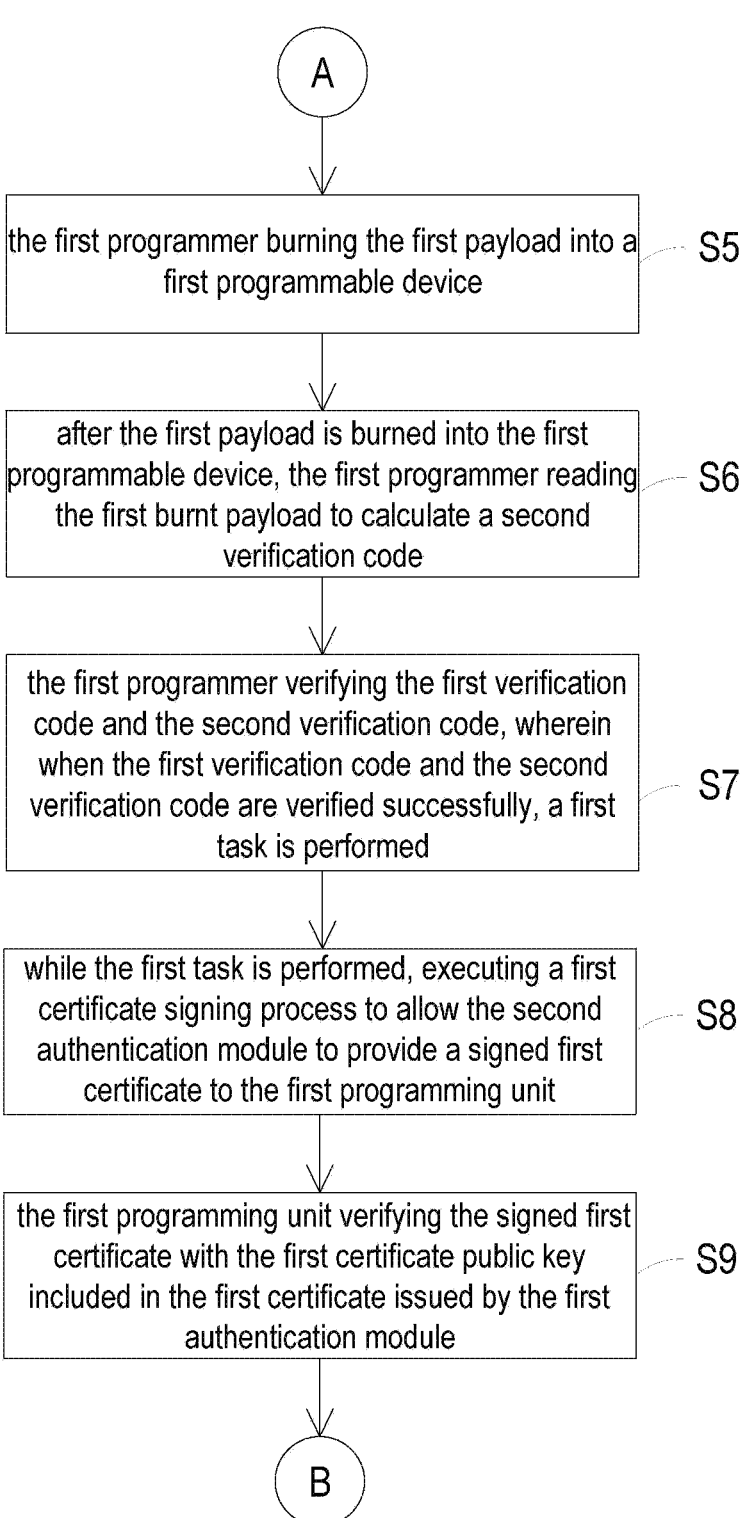
Figure 2:
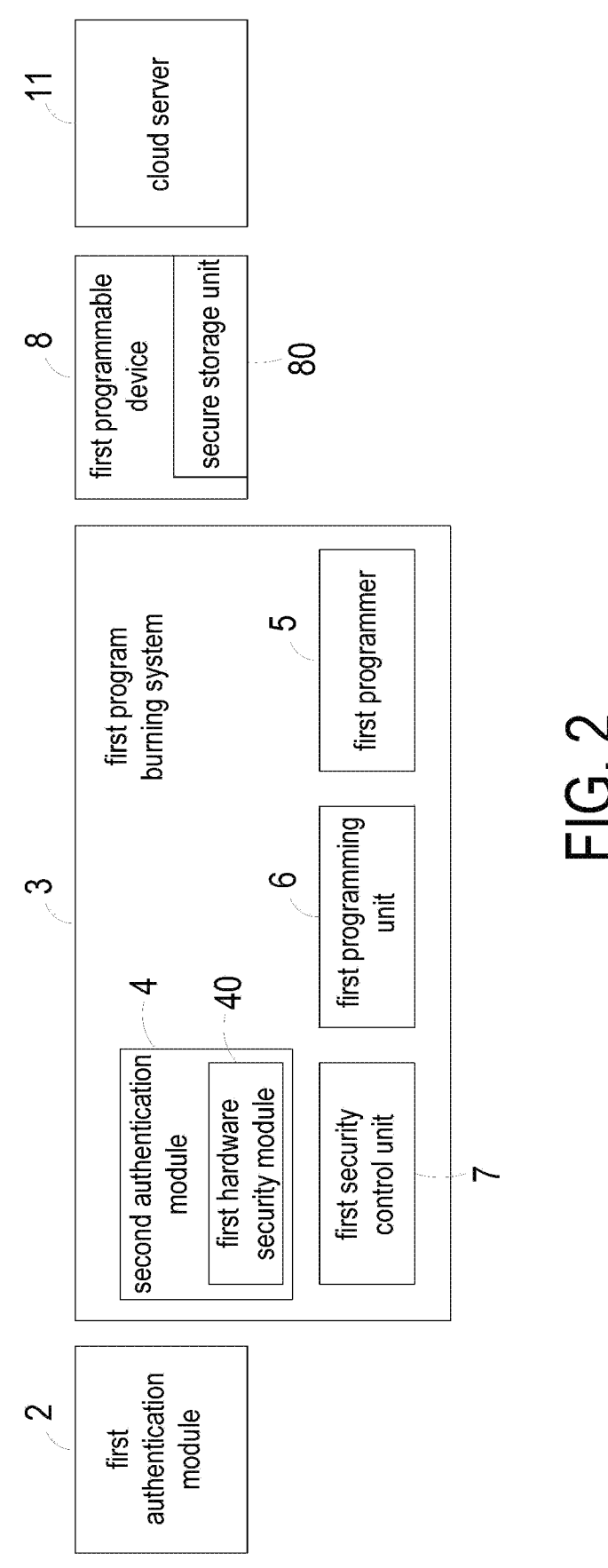
FIG. 2 schematically illustrates the architecture of the secure programming system using the method of FIGS. 1A to 1C according to a first embodiment of the present disclosure.

Please refer to FIGS. 1A to 1C and 2. FIGS. 1A to 1C illustrate a flowchart of a method of operating a secure programming system according to an embodiment of the present invention. FIG. 2 schematically illustrates the architecture of the secure programming system using the method of FIGS. 1A to 1C according to a first embodiment. The present invention provides a method of operating the secure programming system 1. In the embodiment, the secure programing system 1 includes a first authentication module 2 and a first program burning system 3. Preferably but not exclusively, the first authentication module 2 is an original equipment manufacturer (OEM) device. Preferably but not exclusively, the first program burning system 3 is a burning center, and can individually encrypt a target payload of data and code and then program the information into at least one programmable device, such as a first programmable device 8 of the at least one programmable device shown in FIG. 2. For example, the programmable device includes an integrated circuit, a memory chip, a circuit board, or an electronic device (e.g., a smart phone, a media player, or any other appropriate consumer and industrial electronic device). In the embodiment, the first program burning system 3 includes at least one second authentication module 4, a first programmer 5, a first programming unit 6 and a first security control unit 7. Preferably but not exclusively, the second authentication module 4 can authenticate one or more attributes of one of the programmable devices. The first programmer 5 may be an electromechanical system for physically programming a programmable device. The first programming unit 6 can retrieve a job control package with the authentication list and the payload, and verify whether the authentication identification code of the authentication list matches the device identification code of the first programmable device 8. When the authentication identification code matches the device identification code, a successful verification message is generated to the first programmer 5. Furthermore, when the first programmer 5 receives the successful verification message, it allocates the payload provided by the first programming unit 6 to the first programmable device 8.

The first security control unit 7 is used to encrypt the payload with a programmer public key, a first certificate public key, a security module public key, a system supplier's public key or a security control unit public key, and form a job control package with a payload through encryption format. In some embodiments, the first security control unit 7 is a computing device used to process security information. Preferably but not exclusively, the first security control unit 7 includes specific cryptographic and computational hardware to facilitate the processing of cryptographic information. For example, the first security control unit 7 includes a quantum computer, a parallel computing circuit system, a field-programmable gate array (FPGA) configured to process security information, a co-processor, an array logic unit, a microprocessor, or a combination thereof. Moreover, the first security control unit 7 can be specifically configured as a security device to prevent unauthorized access to security information at the input, intermediate, or final stages of processing security information.

In an embodiment, the operating method includes the following steps.

In a step S1, the first authentication module 2 is used as a root authentication module to verify and issue a first certificate. In the embodiment, the first certificate includes a first certificate public key, a first digital signature and a first information content used to identify the first certificate. The first certificate public key corresponds to a first certificate private key, and the first digital signature is signed by the first certificate private key.

In a step S2, the second authentication module 4 provides a first hash value and a first original information to the first authentication module 2. In the embodiment, the first original information is used to generate the first hash value. The first authentication module 2 uses the first certificate private key to encrypt a second hash value regenerated from the first original information provided by the second authentication module 4, so that a second certificate composed of the second digital signature signed by the first authentication module 2 is generated, and the first hash value is used for verification before the first authentication module 2 signs the second hash value regenerated from the first original information. In the embodiment, the second certificate includes the second digital signature signed by the first certificate private key of the first authentication module 2, a second information content used to identify the second certificate, the first information content of the first certificate, the first digital signature of the first certificate and a second certificate public key. Preferably but not exclusively, the second certificate public key corresponds to a second certificate private key, and the second authentication module 4 obtains the second certificate composed of the second digital signature and becomes a first relay authentication module authorized by the first authentication module 2 to issue certificates on behalf of the first authentication module 2.

In a step S3, while a first burning process is executed, the first programmer 5 of the second authentication module 4 served as the first relay authentication module uses a first security control unit key generated by the first security control unit 7 to decrypt a first encrypted job control package so as to extract a first payload.

In a step S4, the first programmer 5 generates a first verification code calculated from the first payload.

In a step S5, the first programmer 5 burns the first payload into a first programmable device 8.

In a step S6, after the first payload is burned into the first programmable device 8, the first programmer 5 reads the burnt first payload to calculate a second verification code.

In a step S7, the first programmer 5 verifies the first verification code and the second verification code. When the first verification code and the second verification code are verified successfully, a first task is performed.

In a step S8, while the first task is performed, a first certificate signing process is executed to allow the second authentication module 4 to provide a signed first certificate to the first programming unit 6.

In a step S9, the first programming unit 6 verifies the signed first certificate with the first certificate public key included in the first certificate issued by the first authentication module 2.

In a step S10, when a verification result of the step S9 is correct, the first programmer 5 generates a third verification code calculated according to the signed first certificate.

In a step S11, the first programmer 5 burns the first certificate into the first programmable device 8.

In a step S12, the first programmer 5 reads the burnt first certificate from the first programmable device 8 and calculates a fourth verification code according to the burnt first certificate.

In a step S13, the first programmer 5 verifies the third verification code and the fourth verification code.

In a step S14, the first programming unit 6 categorizes the first programmable device 8 according to a verification result of the step S13. When the verification result is successful, the first programmable device 8 is categorized into a first output container representing a good output container. In some embodiments, when the verification result is failed, the step S14 further includes: categorizing the first programmable device 8 into a second output container representing a bad output container. In some embodiments, the first output container and the second output container are different carrier trays.

From the above, when the first authentication module 2 (i.e., the original equipment manufacturer) fails to provide the private key, the method of the present disclosure can use the first authentication module 2 as the root authentication module to authorize the second authentication module 4 of the first program burning system 3 (i.e., the burning center).

In this way, the second authentication module 4 obtains the second certificate composed of the second digital signature and becomes the first relay authentication module authorized by the first authentication module 2 to issue certificates on behalf of the first authentication module 2, so that the first program burning system 3 can perform burning operations and process operations. Therefore, the method of the present disclosure can not only achieve the purpose of signing the same certificate in a more secure manner, but also help the first authentication module 2 to be more flexible in classifying the second authentication module 4 according to different product application categories or methods.

In some embodiments, the step S3 includes the following sub-steps.

Firstly, the first security control unit 7 generates a hardware security module public key (HSM Pb.key) and a hardware security module private key (HSM Pr.key) to the first hardware security module 40 by using the asymmetric encryption algorithm. The hardware security module public key and the hardware security module private key match each other. Furthermore, the first security control unit 7 sets the production count that can be used with the corresponding hardware security module public key. The hardware security module public key can be outputted from the first security control unit 7 to the first authentication module 2. In addition, the hardware security module private key is stored within the first hardware security module 40.

Then, the first programming unit 6 retrieves a unique serial number from the first programmer 5. The unique serial number is integrated into an identification list. The identification list is transmitted to the first authentication module 2.

Then, the first authentication module 2 generates a first certificate public key and an OEM private key by using the asymmetric encryption algorithm. The first certificate public key and the OEM private key match each other.

Then, the identification list of the first programmer 5 and the payload are placed into the job control package by the first authentication module 2. Then, the job control package is encrypted according to the first security control unit key that is generated randomly by the first security control unit 7. In addition, the hardware security module public key is loaded to the first security control unit 7, and the first security control unit key and the OEM private key are encrypted according to the hardware security module public key respectively. Afterwards, the encrypted job control package, the encrypted first security control unit key, the encrypted OEM private key, the first certificate public key, an authentication list and the hardware security module public key are transmitted to the first programming unit 6.

Then, the first programming unit 6 reads a device identification code of the first programmable device 8 through the first programmer 5. In addition, the first programming unit 6 verifies the device identification code according to the authentication list.

Then, if the device identification code is verified successfully according to the authentication list, the first programming unit 6 transmits the hardware security module public key to the first hardware security module 40 and requests the first hardware security module 40 to provide the corresponding usable production count. The usable production count is transmitted from the first hardware security module 40 to the first programming unit 6.

Then, according to the usable production count, the first programming unit 6 determines whether a burning task is continuously performed. If the usable production count is 0, the burning task is stopped. Whereas, if the usable production count is not 0, the first programming unit 6 deducts the usable production count by a pre-withheld production count. For example, the pre-withheld production count is at least one. However, if the pre-withheld production count exceeds the usable production count, the upper limit of the usable production count is served as the pre-withheld production count by the first programming unit 6. Then, the pre-withheld production count is stored in the first programming unit 6. Furthermore, the remaining usable production count after deducting the pre-withheld production count is transmitted from the first programming unit 6 to the first hardware security module 40 for storage. In other words, the first programming unit 6 is configured to confirm the stored production count. If the burn count in the first programmer 5 is less than the production count, the first programmer 5 is driven to perform the burning task by the first programming unit 6. Whereas, if the burn count in the first programmer 5 exceeds the production count, the first programmer 5 is still driven by the first programming unit 6 to perform the burning task. However, the burn count in the first programmer 5 may at most reach the upper limit of the usable production count.

Then, the encrypted job control package is transmitted from the first programming unit 6 to the first programmer 5 and stored in a random-access memory (not shown) of the first programmer 5. Then, the encrypted job control package in the first programming unit 6 is erased.

Then, the encrypted first security control unit key, the encrypted OEM private key and the hardware security module public key are transmitted from the first programming unit 6 to the first hardware security module 40 for decryption. The decrypted OEM private key is stored in the first hardware security module 40. After the first programming unit 6 receives the decrypted first security control unit key from the first hardware security module 40, the decrypted first security control unit key is transmitted to the random-access memory of the first programmer 5 to decrypt the encrypted job control package. Afterwards, the first programmer 5 extracts the payload from the decrypted job control package and then extracts the identification list matching the serial number of the first programmer 5. If the serial number is not included in the identification list, the burning task is stopped. If the serial number is included in the identification list, the burning task is performed continuously.

In some embodiments, in the step S9, the first programming unit 6 verifies the first certificate with the first certificate public key, and sends the first certificate to the first programmer 5 after the verification is correct.

In some embodiments, in the step S10, the first programmer 5 uses the first certificate received to calculate the third verification code, and temporarily stores the third verification code in the random-access memory.

In some embodiments, in the step S12, the first programmer 5 reads the first certificate burned into the first programmable device 8 to calculate the fourth verification code.

In some embodiments, in the step S13, the first programmer 5 verifies the third verification code and the fourth verification code temporarily stored in the random-access memory. In addition, after the third verification code and the fourth verification code are verified, the read fourth verification code and the read OEM device certificated are erased by the first programmer 5 immediately.

In some embodiments, the step S3 further includes a sub-step of extracting the payload from the secure storage unit 80 of the first programmable device 8. In some embodiments, the step S3 further includes a sub-step of extracting the first certificate from the secure storage unit 80 of the first programmable device 8.

In some other embodiments, step S14 further includes a sub-step of using a device transfer unit (not shown) to move the first programmable device 8 to the first output container. Preferably but not exclusively, the device transfer unit is a robotic arm of an automation equipment.

In some embodiments, the first programming unit 6 is connected with the first programmer 5. The first programming unit 6 verifies the first certificate with the first certificate public key. If the verification result is successful, the OEM device certificate is transmitted to the first programmer 5. The first programmer 5 is configured to program both of the OEM device certificate and the payload into the first programmable device 8.

Please refer to FIG. 3, and cooperate with FIGS. 1A to 1C and FIG. 2. FIG. 3 illustrates a flow chart of the first certificate signing process in the step S8 shown in FIGS. 1A to 1C according to the first embodiment of the present disclosure. In some embodiments, the first certificate signing process in the step S8 further includes sub-steps as the following. In a step S80, while the first task is performed, the first programming unit 6 generates a first OEM certificate signing request according to a first programmable device public key in the first programmable device 8.

In a step S81, the second authentication module 4 verifies the first OEM certificate signing request according to a first hash value. When the first OEM certificate signing request is verified successfully, a first OEM certificate is generated. In some embodiments, the second authentication module 4 verifies the first OEM certificate signing request according to the first hash value, and a first OEM certificate is generated and transmitted to the first hardware security module 40 when the first OEM certificate signing request is verified successfully. The first hardware security module 40 is configured to sign the first OEM device certificate to generate a signed first OEM device certificate.

In a step S82, the second authentication module 4 signs the first OEM certificate with the second certificate private key corresponding to the second certificate public key included in the second certificate issued by the first authentication module 2, so that a signed first OEM certificate is provided to the first programming unit 6.

In some embodiments, in the above step S80, the first programming unit 6 uses a first identifiable information and the first programmable device public key in the first programmable device 8 to generate the first OEM certificate signing request.

In some embodiments, the step S81 may actually include the following sub-steps.

The first programming unit 6 uses the first OEM certificate signing request to generate the first hash value, and the first hash value is transmitted to the first programmable device 8 through the first programmer 5. After the first programmable device 8 receives the first hash value, the programmable device private key is used to sign the first hash value, and then the signed first hash value is transmitted to the first programming unit 6 through the first programmer 5. Then, the first programming unit 6 transmits the signed first hash value and the first OEM certificate signing request to the second authentication module 4. Then, the second authentication module 4 verifies whether the signed first hash value matches the first OEM certificate signing request. When the verification results match, the first OEM device certificate is generated and transmitted to the first hardware security module 40.

In some embodiments, in the step S82, the first hardware security module 40 receives the first OEM device certificate and signs the first OEM device certificate through the OEM private key stored therein. Moreover, the first signed OEM device certificate is transmitted to the first programming unit 6 through the second authentication module 4.

Please refer to FIG. 4, and cooperate with FIGS. 1A to 1C and FIG. 2. FIG. 4 illustrates a flow chart of the first certificate signing process in the step S8 shown in FIGS. 1A to 1C according to a second embodiment of the present disclosure. In some embodiments, the first certificate signing process in the step S8 further includes sub-steps as the following. In a step 83, the first authentication module 2 provides at least one signed first OEM certificate to the second authentication module 4 in advance. In the embodiment, the at least one signed first OEM certificate corresponds to a first programmable device public key in the first programmable device 8.

In a step S84, while the first task is performed, the second authentication module 4 receives the first programmable device public key from the first programmable device 8, and queries the corresponding signed first OEM certificate from the second authentication module 4 based on the first programmable device public key received, so that the signed first OEM certificate is provided to the first programming unit 6.

In some embodiments, in the above step S83, the at least one signed first OEM certificate corresponds to a first identifiable information and the first programmable device public key in the first programmable device 8. In the above step S84, the second authentication module 4 further receives the first identifiable information from the first programmable device 8, and queries the corresponding signed first OEM certificate from the second authentication module 4 based on the first identifiable information or the first programmable device public key received.

Please refer to FIG. 5, and cooperate with FIGS. 1A to 1C and FIG. 2. FIG. 5 illustrates a flow chart of the first certificate signing process in the step S8 shown in FIGS. 1A to 1C according to a third embodiment of the present disclosure. In some embodiments, the first certificate signing process in the step S8 further includes sub-steps as the following. In a step S85, the first authentication module 2 provides at least one first OEM certificate signing request to the second authentication module 4 in advance. In the embodiment, the at least one first OEM certificate signing request includes a first programmable device public key and a first digital signature.

In a step S86, the second authentication module 4 signs the hash value calculated by the first programmable device public key according to a second digital signature private key of the first hardware security module 40 stored in the second authentication module 4 and corresponded with a second digital signature public key in the first digital signature issued by the first authentication module 2.

In a step S87, the second authentication module 4 generates a digital signature of a first OEM certificate, so that the signed first OEM certificate is generated. In the embodiment, the signed first OEM certificate includes the first programmable device public key and the digital signature of the first OEM certificate.

In a step S88, while the first task is performed, the second authentication module 4 receives the first programmable device public key from the first programmable device 8, and queries the corresponding signed first OEM certificate from the second authentication module 4 based on the first programmable device public key received, so that the signed first OEM certificate is provided to the first programming unit 6.

In some embodiments, in the above step S85, the at least one first OEM certificate signing request further includes a first identifiable information in the first programmable device 8. In the above step S86, the second authentication module 4 signs the hash value calculated by the first identifiable information and the first programmable device public key with the first digital signature private key. In the above step S87, the signed first OEM certificate further includes the first identifiable information. In the above step S88, the second authentication module 4 further receives the first identifiable information from the first programmable device 8, and queries the corresponding signed first OEM certificate from the second authentication module 4 based on the first identifiable information or the first programmable device public key received.

Please refer to FIG. 6, and cooperate with FIGS. 1A to 1C and FIG. 2. FIG. 6 illustrates a flow chart of the first certificate signing process in the step S8 shown in FIGS. 1A to 1C according to a fourth embodiment of the present disclosure. In some embodiments, the first certificate signing process in the step S8 further includes sub-steps as the following. In a step S89, the first authentication module 2 provides at least one signed first OEM certificate to a cloud server 11 in advance. In the embodiment, the at least one signed first OEM certificate corresponds to a first programmable device public key in the first programmable device 8.

In a step S90, while the first task is performed, the cloud server 11 receives the first programmable device public key from the first programmable device 8, and queries the corresponding signed first OEM certificate based on the first programmable device public key received, so that the signed first OEM certificate is provided to the first programming unit 6.

In some embodiments, in the above step S89, the at least one signed first OEM certificate corresponds to a first identifiable information and the first programmable device public key in the first programmable device 8. In the above step S90, the cloud server 11 further receives the first identifiable information from the first programmable device 8, and queries the corresponding signed first OEM certificate based on the first identifiable information or the first programmable device public key received.

Figure 7:
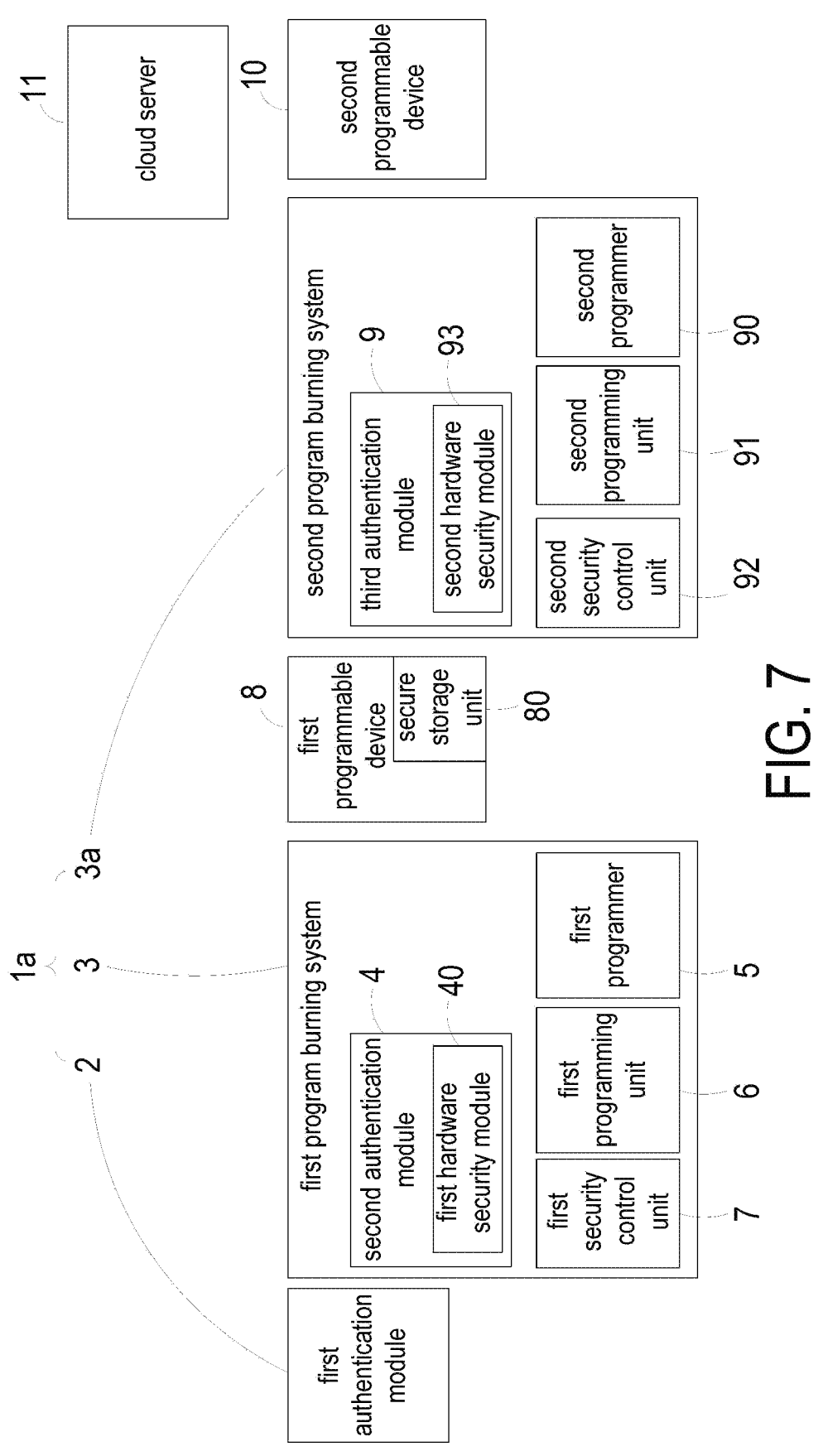
FIG. 7 schematically illustrates the architecture of a secure programming system according to a second embodiment of the present disclosure.
Figure 8C:
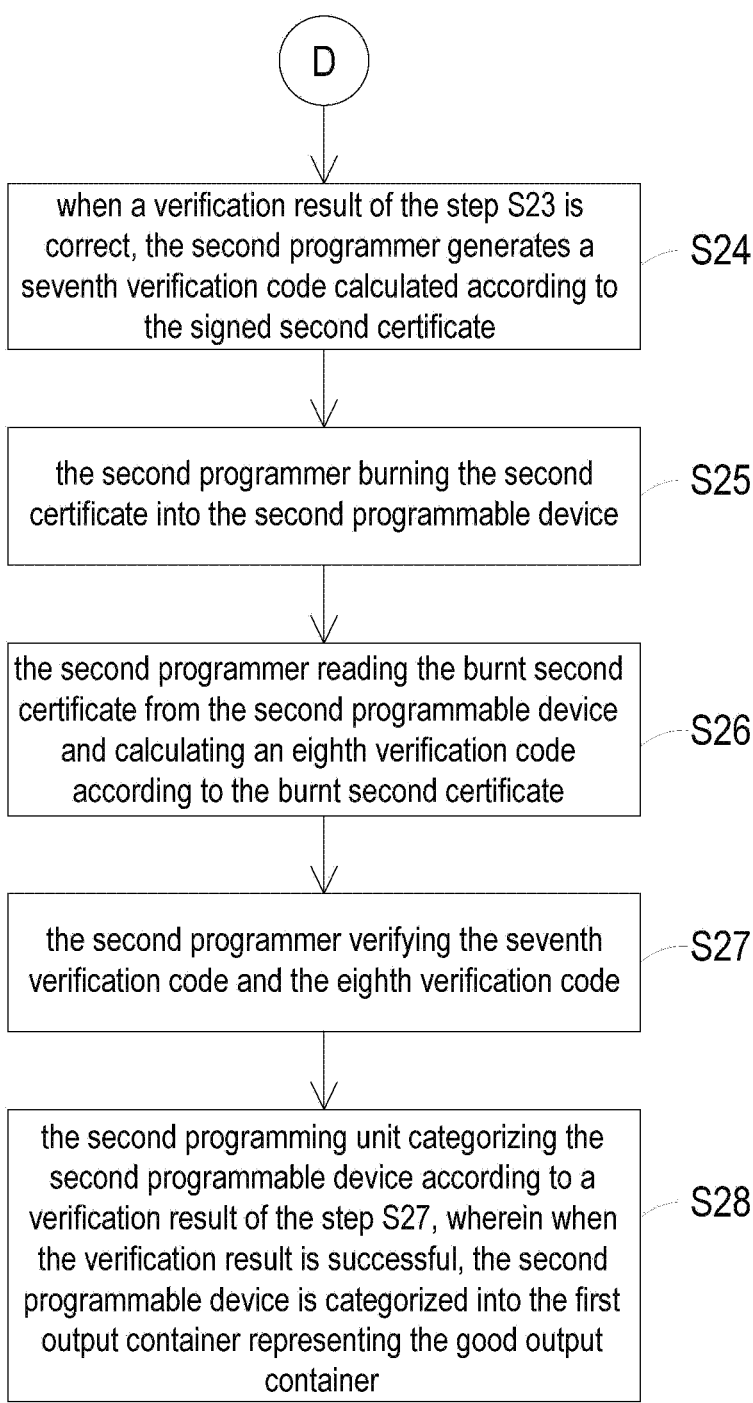

In the secure programming system 1 shown in FIG. 2, it is designed as a two-layer hierarchical system. That is, the secure programming system 1 includes the first authentication module 2 served as the first layer (the highest level) and at least one second authentication module 4 below the first layer. The second authentication module 4 needs the authorization of the first authentication module 2 to perform the subsequent burning process. When a plurality of second authentication modules 4 are included in the secure programming system 1, the plurality of second authentication modules 4 belong to the same layer. However, in other embodiments, the secure programming system may include more than three layers in the hierarchical system. Please refer to FIG. 7 and FIGS. 8A to 8C, and cooperate with FIGS. 1A to 1C. FIG. 7 schematically illustrates the architecture of a secure programming system according to a second embodiment of the present disclosure. FIGS. 8A to 8C illustrate a flowchart of a method of operating the secure programming system shown in FIG. 7 according to an embodiment of the present disclosure. As shown in FIG. 7, in the embodiment, the secure programing system 1a includes a first authentication module 2, a first program burning system 3 and a second program burning system 3a. The structure and operation mode of the first authentication module 2 and the first program burning system 3 shown in FIG. 7 are similar to those of the first authentication module 2 and the first program burning system 3 shown in FIG. 2, and not redundantly described herein. Preferably but not exclusively, the second program burning system 3a is a burning center, and includes a third authentication module 9, a second programmer 90, a second programming unit 91 and a second security control unit 92.

The method of operating the secure programming system la also includes the step S1 and the step S2 shown in FIG. 1A. After the step S2, the method of operating the secure programming system 1a further includes the following steps.

In a step S15, the second authentication module 4 as the first relay authentication module verifies and issues a third certificate. In the embodiment, the third certificate includes a third certificate public key, the third certificate public key corresponds to a third certificate private key.

In a step S16, the third authentication module 9 provides a third hash value and a second original information to the second authentication module 4. In the embodiment, the second original information is used to generate the third hash value. The second authentication module 4 uses the second certificate private key to encrypt a fourth hash value regenerated from the second original information provided by the third authentication module 9, so that the third certificate composed of a third digital signature signed by the second authentication module 4 is generated. The third hash value is used for verification before the second authentication module 4 signs the fourth hash value regenerated from the second original information. The third certificate further includes the third digital signature signed by the second certificate private key of the second authentication module 4, a third information content used to identify the third certificate, the second information content of the second certificate and the second digital signature of the second certificate. The third authentication module 9 obtains the third certificate composed of the third digital signature and becomes a second relay authentication module authorized by the second authentication module 4 to issue certificates on behalf of the second authentication module 4.

In a step S17, while a second burning process is executed, the second programmer 90 of the third authentication module 9 served as the second relay authentication module uses a second security control unit key generated by the second security control unit 92 to decrypt a second encrypted job control package so as to extract a second payload.

In a step S18, the second programmer 90 generates a fifth verification code calculated from the second payload.

In a step S19, the second programmer 90 burns the second payload into a second programmable device 10.

In a step S20, after the second payload is burned into the second programmable device 10, the second programmer 90 reads the burnt first payload to calculate a sixth verification code.

In a step S21, the second programmer verifies the fifth verification code and the sixth verification code. In the embodiment, when the fifth verification code and the sixth verification code are verified successfully, a second task is performed.

In a step S22, while the second task is performed, a second certificate signing process is executed to allow the third authentication module 9 to provide a signed second certificate to the second programming unit 91.

In a step S23, the second programming unit 91 verifies the signed second certificate with the second certificate public key included in the second certificate issued by the second authentication module 4.

In a step S24, when a verification result of the step S23 is correct, the second programmer 90 generates a seventh verification code calculated according to the signed second certificate.

In a step S25, the second programmer 90 burns the second certificate into the second programmable device 10.

In a step S26, the second programmer 90 reads the burnt second certificate from the second programmable device 10 and calculates an eighth verification code according to the burnt second certificate.

In a step S27, the second programmer 90 verifies the seventh verification code and the eighth verification code.

In a step S28, the second programming unit 91 categorizes the second programmable device 10 according to a verification result of the step S27. When the verification result is successful, the second programmable device 10 is categorized into the first output container representing the good output container.

In the above embodiments shown in FIGS. 1A to 1C, after the step S2 is executed, and the second authentication module 4 obtains the second certificate composed of the second digital signature and becomes the first relay authentication module authorized by the first authentication module 2 to issue certificates on behalf of the first authentication module 2, the step S3 to the step S14 are steps for the second authentication module 4 performing the first burning process. In the above embodiments shown in FIGS. 8A to 8C, after the step S2 is executed, and the second authentication module 4 obtains the second certificate composed of the second digital signature and becomes the first relay authentication module authorized by the first authentication module 2 to issue certificates on behalf of the first authentication module 2, the step S15 to the step S18 are steps for the third authentication module 9 obtaining the third certificate composed of the third digital signature, becoming a second relay authentication module authorized by the second authentication module 4 to issue certificates on behalf of the second authentication module 4, and performing the second burning process.

Please refer to FIG. 9, and cooperate with FIG. 7 and FIGS. 8A to 8C. FIG. 9 illustrates a flow chart of the second certificate signing process in the step S22 shown in FIGS. 8A to 8C according to a first embodiment of the present disclosure. In some embodiments, the second certificate signing process in the step S22 further includes sub-steps as the following. In a step S29, while the second task is performed, the second programming unit 91 generates a second OEM certificate signing request according to a second programmable device public key in the second programmable device 10.

In a step S30, the third authentication module 9 verifies the second OEM certificate signing request according to a second hash value. In the embodiment, when the second OEM certificate signing request is verified successfully, a second OEM certificate is generated.

In a step S31, the third authentication module 9 signs the second OEM certificate with the third certificate private key corresponding to the third certificate public key included in the third certificate issued by the second authentication module 4, so that a signed second OEM certificate is provided to the second programming unit 91.

In some embodiments, in the above step S29, the second programming unit 91 uses a second identifiable information and the second programmable device public key in the second programmable device 10 to generate the second OEM certificate signing request.

Please refer to FIG. 10, and cooperate with FIG. 7 and FIGS. 8A to 8C. FIG. 10 illustrates a flow chart of the second certificate signing process in the step S22 shown in FIGS. 8A to 8C according to a second embodiment of the present disclosure. In some embodiments, the second certificate signing process in the step S22 further includes sub-steps as the following. In a step S32, the second authentication module 4 provides at least one signed second OEM certificate to the third authentication module 9 in advance. In the embodiment, the at least one signed second OEM certificate corresponds to a second programmable device public key in the second programmable device 10.

In a step S33, while the second task is performed, the third authentication module 9 receives the second programmable device public key from the second programmable device 10, and queries the corresponding signed second OEM certificate from the third authentication module 9 based on the second programmable device public key received, so that the signed second OEM certificate is provided to the second programming unit 91.

In some embodiments, in the above step S32, the at least one signed second OEM certificate corresponds to a second identifiable information and the second programmable device public key in the second programmable device 10. In the above step S33, the third authentication module 9 further receives the second identifiable information from the second programmable device 10, and queries the corresponding signed second OEM certificate from the third authentication module 9 based on the second identifiable information or the second programmable device public key received.

Please refer to FIG. 11, and cooperate with FIG. 7 and FIGS. 8A to 8C. FIG. 11 illustrates a flow chart of the second certificate signing process in the step S22 shown in FIGS. 8A to 8C according to a third embodiment of the present disclosure. In some embodiments, the second certificate signing process in the step S22 further includes sub-steps as the following. In a step S34, the second authentication module 4 provides at least one signed second OEM certificate to the third authentication module 9 in advance. In the embodiment, the at least one second OEM certificate signing request includes a second programmable device public key and a second digital signature.

In a step S35, the third authentication module 9 signs the hash value calculated by the second programmable device public key according to a third digital signature private key of a second hardware security module 93 stored in the third authentication module 9 and corresponded with a third digital signature public key in the second digital signature issued by the second authentication module 4.

In a step S36, the third authentication module 9 generates a digital signature of a second OEM certificate, so that the signed second OEM certificate is generated. In the embodiment, the signed second OEM certificate includes the second programmable device public key and the digital signature of the second OEM certificate.

In a step S37, while the second task is performed, the third authentication module 9 receives the second programmable device public key from the second programmable device 10, and queries the corresponding signed second OEM certificate from the third authentication module 9 based on the second programmable device public key received, so that the signed second OEM certificate is provided to the second programming unit 91.

In some embodiments, in the above step S34, the at least one second OEM certificate signing request further includes a second identifiable information in the second programmable device 10. In the above step S35, the third authentication module 9 signs the hash value calculated by the second identifiable information and the second programmable device public key with the second digital signature private key. In the above step S36, the signed second OEM certificate further includes the second identifiable information. In the above step S37, the third authentication module 9 further receives the second identifiable information from the second programmable device 10, and queries the corresponding signed second OEM certificate from the third authentication module 9 based on the second identifiable information or the second programmable device public key received.

Please refer to FIG. 12, and cooperate with FIG. 7 and FIGS. 8A to 8C. FIG. 12 illustrates a flow chart of the second certificate signing process in the step S22 shown in FIGS. 8A to 8C according to a fourth embodiment of the present disclosure. In some embodiments, the second certificate signing process in the step S22 further includes sub-steps as the following. In a step S38, the second authentication module 4 provides at least one signed second OEM certificate to a cloud server 11 in advance. In the embodiment, the at least one signed second OEM certificate corresponds to a second programmable device public key in the second programmable device 10.

In a step S39, while the second task is performed, the cloud server 11 receives the second programmable device public key from the second programmable device 10, and queries the corresponding signed second OEM certificate based on the second programmable device public key received, so that the signed second OEM certificate is provided to the second programming unit 91.

In some embodiments, in the above step S38, the at least one signed second OEM certificate corresponds to a second identifiable information and the second programmable device public key in the second programmable device 10. In the above step S39, the cloud server 11 further receives the second identifiable information from the second programmable device 10, and queries the corresponding signed second OEM certificate based on the second identifiable information or the second programmable device public key received.

From the above, the present disclosure provides a method of operating a secure programming system. The method can use the first authentication module as the root authentication module to authorize the second authentication module of the program burning system when the first authentication module fails to provide the private key. In this way, the second authentication module obtains the second certificate composed of the second digital signature and becomes the first relay authentication module authorized by the first authentication module to issue certificates on behalf of the first authentication module, so that the program burning system can perform burning operations and process operations. Therefore, the method of the present disclosure can not only achieve the purpose of signing the same certificate in a more secure manner, but also help the first authentication module to be more flexible in classifying the second authentication module according to different product application categories or methods While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of operating a secure programming system, the secure programming system comprising a first authentication module and a program burning system, the program burning system comprising a second authentication module, a first programmer, a first programming unit and a first security control unit, the method comprising steps of:

(S1) using the first authentication module as a root authentication module to verify and issue a first certificate, wherein the first certificate comprises a first certificate public key, a first digital signature and a first information content used to identify the first certificate, the first certificate public key corresponds to a first certificate private key, and the first digital signature is signed by the first certificate private key;

(S2) providing a first hash value and a first original information to the first authentication module by the second authentication module, wherein the first original information is used to generate the first hash value, the first authentication module uses the first certificate private key to encrypt a second hash value regenerated from the first original information provided by the second authentication module as a second digital signature, and generates a second certificate composed of the second digital signature signed by the first authentication module, and the first hash value is used for verification before the first authentication module signs the second hash value regenerated from the first original information, wherein the second certificate comprises the second digital signature signed by the first certificate private key of the first authentication module, a second information content used to identify the second certificate, the first information content of the first certificate, the first digital signature of the first certificate and a second certificate public key, the second certificate public key corresponds to a second certificate private key, and the second authentication module obtains the second certificate composed of the second digital signature and becomes a first relay authentication module authorized by the first authentication module to issue certificates on behalf of the first authentication module;

(S3) while a first burning process is executed, the first programmer of the second authentication module served as the first relay authentication module using a first security control unit key generated by the first security control unit to decrypt a first encrypted job control package so as to extract a first payload;

(S4) the first programmer generating a first verification code calculated from the first payload;

(S5) the first programmer burning the first payload into a first programmable device;

(S6) after the first payload is burned into the first programmable device, the first programmer reading the burnt first payload to calculate a second verification code;

(S7) the first programmer verifying the first verification code and the second verification code, wherein when the first verification code and the second verification code are verified successfully, a first task is performed;

(S8) while the first task is performed, executing a first certificate signing process to allow the second authentication module to provide a signed first certificate to the first programming unit;

(S9) the first programming unit verifying the signed first certificate with the first certificate public key included in the first certificate issued by the first authentication module;

(S10) when a verification result of the step S9 is correct, the first programmer generates a third verification code calculated according to the signed first certificate;

(S11) the first programmer burning the first certificate into the first programmable device;

(S12) the first programmer reading the burnt first certificate from the first programmable device and calculating a fourth verification code according to the burnt first certificate;

(S13) the first programmer verifying the third verification code and the fourth verification code; and (S14) the first programming unit categorizing the first programmable device according to a verification result of the step S13, wherein when the verification result is successful, the first programmable device is categorized into a first output container representing a good output container.

2. The method according to claim 1, wherein the first certificate signing process comprises:

(S80) while the first task is performed, the first programming unit generating a first original equipment manufacturer (OEM) certificate signing request according to a first programmable device public key in the first programmable device;

(S81) the second authentication module verifying the first OEM certificate signing request according to the first hash value, wherein when the first OEM certificate signing request is verified successfully, a first OEM certificate is generated; and (S82) the second authentication module signing the first OEM certificate with the second certificate private key corresponding to the second certificate public key included in the second certificate issued by the first authentication module, so that a signed first OEM certificate is provided to the first programming unit.

3. The method according to claim 2, wherein in the step (S80), the first programming unit uses a first identifiable information and the first programmable device public key in the first programmable device to generate the first OEM certificate signing request.

4. The method according to claim 1, wherein the first certificate signing process comprises:

(S83) the first authentication module providing at least one signed first OEM certificate to the second authentication module in advance, wherein the at least one signed first OEM certificate corresponds to a first programmable device public key in the first programmable device; and (S84) while the first task is performed, the second authentication module receiving the first programmable device public key from the first programmable device, and querying and retrieving the corresponding signed first OEM certificate based on the received first programmable device public key, so that the signed first OEM certificate is provided to the first programming unit.

5. The method according to claim 4, wherein in the step (S83), the at least one signed first OEM certificate corresponds to a first identifiable information and the first programmable device public key in the first programmable device, wherein in the step (S84), the second authentication module further receives the first identifiable information from the first programmable device, and queries and retrieves the corresponding signed first OEM certificate based on the received first identifiable information or the received first programmable device public key.

6. The method according to claim 1, wherein the first certificate signing process comprises:

(S85) the first authentication module providing at least one first OEM certificate signing request to the second authentication module in advance, wherein the at least one first OEM certificate signing request comprises a first programmable device public key and a the first digital signature;

(S86) the second authentication module signs the hash value, which is calculated from the first programmable device public key, by using a second digital signature private key of a first security module, wherein the second digital signature private key is stored in the second authentication module, and the private key corresponds to a second digital signature public key in the first digital signature issued by the first authentication module;

(S87) the second authentication module generating a digital signature of a first OEM certificate, so that the signed first OEM certificate is generated, wherein the signed first OEM certificate comprises the first programmable device public key and the digital signature of the first OEM certificate; and (S88) while the first task is performed, the second authentication module receiving the first programmable device public key from the first programmable device, and querying and retrieving the corresponding signed first OEM certificate based on the received first programmable device public key, so that the signed first OEM certificate is provided to the first programming unit.

7. The method according to claim 6, wherein in the step (S85), the at least one first OEM certificate signing request further comprises a first identifiable information of the first programmable device;

wherein in the step (S86), the second authentication module signs the hash value by the first digital signature private key, wherein the hash value is calculated by the first identifiable information and the first programmable device public key;

wherein in the step (S87), the signed first OEM certificate further comprises the first identifiable information;

wherein in the step (S88), the second authentication module further receives the first identifiable information from the first programmable device, and queries and retrieves the corresponding signed first OEM certificate based on the received first identifiable information or the received first programmable device public key.

8. The method according to claim 1, wherein the first certificate signing process comprises:

(S89) the first authentication module providing at least one signed first OEM certificate to a cloud server in advance, wherein the at least one signed first OEM certificate corresponds to a first programmable device public key in the first programmable device; and (S90) while the first task is performed, the cloud server receiving the first programmable device public key from the first programmable device, and querying and retrieving the corresponding signed first OEM certificate based on the received first programmable device public key, so that the signed first OEM certificate is provided to the first programming unit.

9. The method according to claim 8, wherein in the step (S89), the at least one signed first OEM certificate corresponds to a first identifiable information and the first programmable device public key in the first programmable device, wherein in the step (S90), the cloud server further receives the first identifiable information from the first programmable device, and retrieves the corresponding signed first OEM certificate based on the received first identifiable information or the received first programmable device public key.

10. The method according to claim 1, wherein the program burning system of the secure programming system comprises a third authentication module, a second programmer, a second programming unit and a second security control unit, wherein after the step (S2), the method further comprises steps of:

(S15) the second authentication module as the first relay authentication module verifying and issuing a third certificate, wherein the third certificate comprises a third certificate public key, the third certificate public key corresponds to a third certificate private key;

(S16) providing a third hash value and a second original information to the second authentication module by the third authentication module, wherein the second original information is used to generate the third hash value, the second authentication module uses the second certificate private key to encrypt a fourth hash value regenerated from the second original information provided by the third authentication module, so that the third certificate composed of a third digital signature signed by the second authentication module is generated, and the third hash value is used for verification before the second authentication module signs the fourth hash value regenerated from the second original information, wherein the third certificate comprises the third digital signature signed by the second certificate private key of the second authentication module, a third information content used to identify the third certificate, the second information content of the second certificate and the second digital signature of the second certificate, and the third authentication module obtains the third certificate composed of the third digital signature and becomes a second relay authentication module authorized by the second authentication module to issue certificates on behalf of the second authentication module;

(S17) while a second burning process is executed, the second programmer of the third authentication module served as the second relay authentication module using a second security control unit key generated by the second security control unit to decrypt a second encrypted job control package so as to extract a second payload;

(S18) the second programmer generating a fifth verification code calculated from the second payload;

(S19) the second programmer burning the second payload into a second programmable device;

(S20) after the second payload is burned into the second programmable device, the second programmer reading the burnt second payload to calculate a sixth verification code;

(S21) the second programmer verifying the fifth verification code and the sixth verification code, wherein when the fifth verification code and the sixth verification code are verified successfully, a second task is performed;

(S22) while the second task is performed, executing a second certificate signing process to allow the third authentication module to provide a signed second certificate to the second programming unit;

(S23) the second programming unit verifying the signed second certificate with the second certificate public key included in the second certificate issued by the second authentication module;

(S24) when a verification result of the step S23 is correct, the second programmer generates a seventh verification code calculated according to the signed second certificate;

(S25) the second programmer burning the second certificate into the second programmable device;

(S26) the second programmer reading the burnt second certificate from the second programmable device and calculating an eighth verification code according to the burnt second certificate;

(S27) the second programmer verifying the seventh verification code and the eighth verification code; and (S28) the second programming unit categorizing the second programmable device according to a verification result of the step S27, wherein when the verification result is successful, the second programmable device is categorized into the first output container representing the good output container.

11. The method according to claim 10, wherein the second certificate signing process comprises:

(S29) while the second task is performed, the second programming unit generating a second OEM certificate signing request according to a second programmable device public key in the second programmable device;

(S30) the third authentication module verifying the second OEM certificate signing request according to the second hash value, wherein when the second OEM certificate signing request is verified successfully, a second OEM certificate is generated; and (S31) the third authentication module signing the second OEM certificate with the third certificate private key corresponding to the third certificate public key included in the third certificate issued by the second authentication module, so that a signed second OEM certificate is provided to the second programming unit.

12. The method according to claim 11, wherein in the step (S29), the second programming unit uses a second identifiable information and the second programmable device public key in the second programmable device to generate the second OEM certificate signing request.

13. The method according to claim 10, wherein the second certificate signing process comprises:

(S32) the second authentication module providing at least one signed second OEM certificate to the third authentication module in advance, wherein the at least one signed second OEM certificate corresponds to a second programmable device public key in the second programmable device; and (S33) while the second task is performed, the third authentication module receiving the second programmable device public key from the second programmable device, and querying and retrieving the corresponding signed second OEM certificate based on the received second programmable device public key, so that the signed second OEM certificate is provided to the second programming unit.

14. The method according to claim 13, wherein in the step (S32), the at least one signed second OEM certificate corresponds to a second identifiable information and the second programmable device public key in the second programmable device, wherein in the step (S33), the third authentication module further receives the second identifiable information from the second programmable device, and queries and retrieves the corresponding signed second OEM certificate based on the received second identifiable information or the received second programmable device public key.

15. The method according to claim 10, wherein the second certificate signing process comprises:

(S34) the second authentication module providing at least one second OEM certificate signing request to the third authentication module in advance, wherein the at least one second OEM certificate signing request comprises a second programmable device public key and the second digital signature;

(S35) the third authentication module signs a fifth hash value, which is calculated from the second programmable device public key, by using a third digital signature private key of a second security module, wherein the third digital signature private key is stored in the third authentication module, and the private key corresponds to a third digital signature public key in the second digital signature issued by the second authentication module;

(S36) the third authentication module generating a digital signature of a second OEM certificate, so that the signed second OEM certificate is generated, wherein the signed second OEM certificate comprises the second programmable device public key and the digital signature of the second OEM certificate; and (S37) while the second task is performed, the third authentication module receiving the second programmable device public key from the second programmable device, and querying and retrieving the corresponding signed second OEM certificate based on the received second programmable device public key, so that the signed second OEM certificate is provided to the second programming unit.

16. The method according to claim 15, wherein in the step (S34), the at least one second OEM certificate signing request further comprises a second identifiable information in the second programmable device;

wherein in the step (S35), the third authentication module signs the fifth hash value calculated by the second identifiable information and the second programmable device public key with the second digital signature private key;

wherein in the step (S36), the signed second OEM certificate further comprises the second identifiable information;

wherein in the step (S37), the third authentication module further receives the second identifiable information from the second programmable device, and queries and retrieves the corresponding signed second OEM certificate based on the received second identifiable information or the received second programmable device public key.

17. The method according to claim 10, wherein the second certificate signing process comprises:

(S38) the second authentication module providing at least one signed second OEM certificate to a cloud server in advance, wherein the at least one signed second OEM certificate corresponds to the second programmable device public key in the second programmable device; and (S39) while the second task is performed, the cloud server receiving the second programmable device public key from the second programmable device, and querying and retrieving the corresponding signed second OEM certificate based on the received second programmable device public key, so that the signed second OEM certificate is provided to the second programming unit.

18. The method according to claim 17, wherein in the step (S38), the at least one signed second OEM certificate corresponds to the second identifiable information and the second programmable device public key in the second programmable device, wherein in the step (S39), the cloud server further receives the second identifiable information from the second programmable device, and retrieves the corresponding signed second OEM certificate based on the received second identifiable information or the received second programmable device public key.

\* \* \* \* \*